United States Patent [19]
Schleifer et al.

[11] 3,792,553
[45] Feb. 19, 1974

[54] ABRASIVE POWDER OF FUSED ALUMINA CONTAINING VANADIUM TETROXIDE

[75] Inventors: Ronald H. Schleifer, Churchville; James E. Price, Abington, both of Pa.; Henry J. Bowden, Arvida, Quebec, Canada

[73] Assignee: Wallace-Murray Corporation, New York, N.Y.

[22] Filed: Sept. 28, 1971

[21] Appl. No.: 184,629

[52] U.S. Cl.................. 51/309, 51/298, 51/308, 106/65
[51] Int. Cl.................... C04b 31/16, C09c 1/68
[58] Field of Search......... 51/309, 308, 307; 106/65

[56] References Cited
UNITED STATES PATENTS

| | | | |
|---|---|---|---|
| 2,360,841 | 10/1944 | Baumann et al.................. | 51/309.1 |
| 2,369,709 | 2/1945 | Baumann et al.................. | 51/309.1 |
| 2,418,496 | 4/1947 | Baumann et al.................. | 51/309 |
| 2,961,296 | 11/1960 | Fenerty............................. | 51/309 |
| 3,615,307 | 10/1971 | Jones................................ | 51/309 |

*Primary Examiner*—Donald J. Arnold
*Attorney, Agent, or Firm*—Louis F. Reed

[57] ABSTRACT

Excellent abrasive materials are provided by incorporating between about 0.1 and 7.5 percent, preferably 0.25 and 5.0 percent, and optimally about 1.5 percent by weight of vanadium tetroxide into a material high in alumina content, such as bauxite, corundum and relatively pure alumina. The vanadium tetroxide is fused per se in the alumina-containing material under non-reducing conditions or, preferably introduced as vanadium pentoxide with a stoichiometric amount of a reducing agent, such as aluminum metal, carbon, etc., to reduce the vanadium pentoxide to vanadium tetroxide.

The fusion of the vanadium tetroxide in the alumina is accomplished in an electric furnace whereby the electric current is conducted through a layer of molten alumina at the bottom of the furnace with the liquid layer being covered with a substantial layer of a mixture of powdered solid alumina and the vanadium tetroxide-providing source.

12 Claims, No Drawings

ABRASIVE POWDER OF FUSED ALUMINA CONTAINING VANADIUM TETROXIDE

BACKGROUND OF THE INVENTION

The present invention relates to excellent and improved alumina refractories and abrasives and abrasive articles produced therefrom. The invention also relates to a novel process for producing the abrasive powders of the invention.

Abrasive materials based on bauxite or other materials high in alumina have long been utilized as commercial abrasives. The prior art discloses the production of abrasive materials from alumina or bauxite by preparation under reducing conditions in an electric furnace. In accordance with one known product a solid solution is provided of chromium sesquioxide in alumina and upon being crushed provides a reddish abrasive which has been a commercial abrasive of choice for some time.

There is disclosed in British patent 574,843 an abrasive material comprising alumina containing from 0.25 to 20 percent of chromium sesquioxide or vanadium sesquioxide in solid solution in the grains. Although the British patent suggests a bright future for the abrasive material of the patent, the vanadium sesquioxide-containing alumina product of the patent has never been produced commercially so far as is known.

Baumann et al. U.S. Pat. No. 2,418,496 deals with subject matter somewhat related to the British patent, but it is more concerned with a sintered alumina grain containing in its exterior surface small amounts of vanadium sesquioxide, chromium sesquioxide and certain oxides of other metals. These materials are described as being "case-treated" alumina particles. These vanadium sesquioxide case-treated products have also never been produced commercially so far as is known. The shortcomings of vanadium sesquioxide in alumina abrasives is revealed by this patent, columns 2 and 3, wherein it is stated that none of the oxides other than chromium sesquioxide forms a continuous solid solution with alumina.

Baumann et al. U.S. Pat. No. 2,369,709 refers to sintered products of alumina with titanium oxide and chromium sesquioxide, manganese sesquioxide, vanadium sesquioxide, or vanadium pentoxide as the source of vanadium sesquioxide.

Rosenberg et al. U.S. Pat. No. 2,768,887 describes a process for producing alumina abrasives containing solid solutions of small amounts of reduced metal oxides by an electric furnace. In the process of that patent an electric furnace is employed to fuse the mixture to provide a thin liquid layer of molten substance which is supported on the surface of solidified material. This is just the opposite of the process employed in the present invention whereby the initial molten pool of material is fed alumina powder plus additive vanadium oxide until the entire furnace charge is liquified. The surface of the liquified charge is kept covered with powdered mix throughout the furnacing operation.

It is an object of the present invention to provide alumina based materials having superior abrasive characteristics.

It is also an object of the present invention to provide a vanadium tetroxide-containing alumina grain which provides an abrasion material which can be readily fabricated into abrasive articles, such as grinding wheels and the like.

It is a further object of the present invention to provide a novel process for providing the vanadium tetroxide-containing alumina abrasives of the invention.

Other objects will become apparent to those skilled in the art from the present description.

SUMMARY OF THE INVENTION

It has been discovered that excellent abrasive materials are provided by fusing throughout a material high in alumina, such as bauxite, corundum or pure alpha alumina, between about 0.1 and 7.5 percent by weight of vanadium tetroxide, preferably 0.25 to 5.0 percent vanadium tetroxide, and optimally 1.5 percent, into the alumina containing material by fusion. The compositions of the invention provide excellent abrasive characteristics which make them suitable for a commercially desirable abrasive material or abrasive articles produced from it.

The present invention comprises an excellent abrasive material formed from materials high in alumina, such as calcined alumina, bauxite having more than 80 percent alumina or corundum, consisting essentially of alpha alumina containing in solid solution substantially uniformly throughout the material between about 0.1 and 7.5 percent; preferably from 0.25 to 5.0 percent, and optimally 1.5 percent by weight vanadium tetroxide based on weight of alumina in the material. These products are produced by incorporating a desired amount of vanadium tetroxide per se in the alumina and fusing it under non-reducing conditions or by incorporating the corresponding amount of vanadium pentoxide into the alumina and fusing it with a stoichiometric amount of aluminum, carbon, or other reducing agent, to produce the desired amount of vanadium tetroxide when fused with the alumina in an electric furnace in accordance with the process of the present invention.

The introduction of the vanadium tetroxide in solid solution is extraordinarily effective in increasing the hardness and toughness of the alumina.

In accordance with the process of the present invention the fusion takes place at a temperature of between about 3400° and 4000°F. in an electric furnace wherein the molten portion of a mixture of alumina and vanadium tetroxide or vanadium tetroxide-providing material is covered by the solid powdered unmolten mixture of the same components of a thickness sufficient to prevent oxidation and heat loss. When the entire charge has been fused it is allowed to cool in the furnace or is poured into separate cooling receptacles. In either case the cooled solid solution is crushed to the desired abrasive grit sizes.

The abrasive materials of the invention are characterized by a unique greenish color. With contents of about 1.25 percent vanadium tetroxide and above the color is deep green and at lower contents the color is light green.

From the abrasive materials of the invention, abrasive articles, such as grinding wheels and the like, may be produced having excellent abrasive properties, although the abrasive powders have excellent abrasive properties and can be used in powdered form. For example, grinding wheels of the abrasive materials of the invention have a life of 8 hours compared to only 2 hours of otherwise identical wheels employing ordinary white alumina, when used under identical circumstances. Also, the grinding wheels of the invention reduce the time of grinding an identical part or piece of metal, for example from 60 to 34 seconds.

DETAILED DESCRIPTION OF THE INVENTION

In order to disclose more clearly the nature of the present invention, the following examples illustrating the invention are given. It should be understood, however, that this is done solely by way of example and is intended neither to delineate the scope of the invention nor limit the ambit of the appended claims. In the examples which follow, and throughout the specification, the quantities of material are expressed in terms of parts or percentages by weight, unless otherwise specified.

EXAMPLE 1

To about 4000 pounds of finely divided Bayer-process alumina of high purity there was added 1.35 percent by weight of substantially pure vanadium pentoxide and 6.48 pounds of aluminum metal (the stoichiometric amount of aluminum metal to reduce all of the vanadium pentoxide to vanadium tetroxide in accordance with the equation—$3V_2O_5 + 2Al \rightarrow Al_2O_3 + 3V_2O_4$) and the composition was mixed thoroughly. It was then placed in a Higgins-type electric furnace and fused at a temperature of about 3800°F. for 12 hours, using three-phase power at 115 volts with approximately 1000 amperes on each electrode, or a total of 200 KVA. In accordance with the preferred process of the invention, at substantially all times the melt was covered by a layer of powdered unfused mixture. After cooling in the furnace the mass was crushed by rolls to produce abrasive particles which were uniformly deep green in color.

EXAMPLE 2

To about 20,000 pounds of finely divided high purity alumina there was added 1.35% by weight of substantially pure vanadium pentoxide and 21.6 pounds of petroleum coke (the stoichiometric amount of carbon to reduce all of the vanadium pentoxide to vanadium tetroxide in accordance with the equation—$V_2O_5 + C \rightarrow CO + V_2O_4$) and the composition was mixed thoroughly. It was then placed in a furnace and heated to a temperature of about 3800°F. for 60 hours. In accordance with the preferred process of the invention, at substantially all times the melt was covered by a layer of powdered unfused mixture. After cooling in the furnace, the mass was crushed by rolls to produce abrasive particles which were uniformly deep green in color.

EXAMPLE 3

To about 4000 pounds of finely divided alumina there was added 0.75 percent by weight of substantially pure vanadium pentoxide and 3.60 parts by weight of aluminum metal powder (the stoichiometric amount of aluminum to reduce all of the vanadium pentoxide to vanadium tetroxide) and the composition was mixed thoroughly. It was then placed in a furnace and heated to a temperature of about 3800°F for 12 hours. In accordance with the preferred process of the invention, at substantially all times the melt was covered by a layer of powdered unfused mixture. After cooling in the furnace, the mass was crushed by rolls to produce abrasive particles which were uniformly bluish-green in color.

In the foregoing examples the vanadium pentoxide and reducing agent may be replaced by an equivalent amount of vanadium tetroxide per se.

The green alumina abrasive particles from the foregoing examples is suitable for producing abrasive articles such as grinding wheels and the like in the usual manner with which the art is familiar.

EXAMPLE 4

In accordance with one method of producing grinding wheels, employing vitrification, a mixture of the particles of any one of Examples 1–3 and 8 percent by weight of siliceous vitreous bonding agent were pressed into the desired shape, such as that of a grinding wheel, and fixed at a temperature of 1750° F. for 16 hours. The grinding wheel which was then formed had a green color.

EXAMPLE 5

In accordance with another vitrification method of forming abrasive articles from the abrasive powder of the invention, the powder from any of the Examples 1–3 was molded into the form of grinding wheel and fixed in air at 2250° F. for 128 hours, after which the color of the article was olive, which reflected a color transition which takes place at highly elevated temperatures.

EXAMPLE 6

Employing 10 percent by weight of a phenolic bonding resin, a grinding wheel was fabricated by molding an abrasive powder in accordance with any of Examples 1–3 after which the wheel was cured at a temperature of 350° F. for 48 hours. The resulting grinding wheel retained the green color which is characteristic of the abrasive powders of the present invention.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. An abrasive powder material consisting essentially of fused alumina containing between about 0.1 and 7.5 percent by weight of vanadium tetroxide in solid solution.

2. An abrasive powder material in accordance with claim 1 wherein the amount of vanadium tetroxide is between about 0.25 and 5.0 percent by weight.

3. An abrasive material in accordance with claim 1 wherein the amount of vanadium tetroxide is about 1.5 percent by weight.

4. An abrasive article of bonded abrasive grains, said grains being consisting essentially of fused alumina containing between about 0.1 and 7.5 percent by weight of vanadium tetroxide in solid solution.

5. An abrasive article in accordance with claim 4 wherein the amount of vanadium tetroxide is between about 0.25 and 5.0 percent by weight.

6. An abrasive article in accordance with claim 4 wherein the amount of vanadium tetroxide is about 1.5 percent by weight.

7. A grinding wheel of bonded abrasive grains, said grains consisting essentially of alumina containing between about 0.1 and 7.5 percent by weight of vanadium tetroxide in solid solution.

8. A grinding wheel in accordance with claim 7 wherein the amount of vanadium tetroxide is between about 0.25 and 5.0 percent by weight.

9. A grinding wheel in accordance with claim 7 wherein the amount of vanadium tetroxide is about 1.5 percent by weight.

10. A process for producing an abrasive material comprising fusing a mixture of alumina and between about 0.1 and 7.5 percent by weight of vanadium pentoxide and a stoichiometric quantity of a reducing agent to reduce substantially all of the vanadian pentoxide to vanadium tetroxide, providing a cover layer of unmolten mixture of alumina and vanadium pentoxide over the fused mixture substantially throughout the fusion process, cooling the resulting fused mixture of alumina and vanadium tetroxide to a solid, and crushing to particles of desired size.

11. A process according to claim 10 wherein the reducing agent is a member of the class consisting of aluminum metal and carbon.

12. A process for producing an abrasive material comprising fusing under non-reducing conditions a mixture of alumina and between about 0.1 and 7.5 percent by weight of vanadium tetroxide, providing a cover layer of unmolten mixture over the fused mixture substantially throughout the fusion process, cooling the fused mixture to a solid, and crushing to particles of desired size.

* * * * *